United States Patent [19]
Cook, Jr. et al.

[11] Patent Number: 5,936,313
[45] Date of Patent: Aug. 10, 1999

[54] SWITCHED CAPACITOR CIRCUIT FOR FIRING VEHICLE AIRBAG SQUIBS

[75] Inventors: Charles R. Cook, Jr., Rochester Hills; Horst Belau, Clarkston, both of Mich.

[73] Assignee: Siemens Automotive Corp., Auburn Hills, Mich.

[21] Appl. No.: 08/907,196

[22] Filed: Aug. 6, 1997

[51] Int. Cl.$^6$ ................................................. B60R 21/32
[52] U.S. Cl. ........................ 307/10.1; 180/282; 280/735
[58] Field of Search .................................. 307/10.1, 9.1, 307/121; 280/734, 735; 180/271, 273, 282; 340/436, 438, 669; 701/36, 45–47

[56] References Cited

U.S. PATENT DOCUMENTS

| | | | |
|---|---|---|---|
| 5,158,323 | 10/1992 | Yamamoto et al. | 280/735 |
| 5,554,890 | 9/1996 | Kiroshita | 307/10.1 |
| 5,646,454 | 7/1997 | Mattes et al. | 307/10.1 |
| 5,668,528 | 9/1997 | Kitao et al. | 340/436 |
| 5,734,317 | 3/1998 | Bennett et al. | 307/10.1 |

FOREIGN PATENT DOCUMENTS

| | | |
|---|---|---|
| 296 09 556 U | 8/1996 | Germany . |
| 195 24 329 | 1/1997 | Germany . |
| 196 38 457 | 1/1998 | Germany . |

*Primary Examiner*—Richard T. Elms

[57] ABSTRACT

A switched capacitor circuit for delivering electrical triggering energy to an airbag squib of a supplemental restraint system for a vehicle, or a plurality of such airbag squibs, employs a switching arrangement on both sides of the airbag squib. An energy storage element, which may be a capacitor having stored therein a quantum of energy sufficient to fire the airbag squibs is coupled thereto by a substantially series pair of electronic switches connecting each terminal of the storage capacitor to each terminal of the airbag squib arrangement. A further capacitor is coupled across the airbag squib arrangement, electrically intermediate of the substantially series pairs of electronic switches. A still further capacitor is coupled across the airbag squib arrangement itself. This arrangement can withstand plural short-circuit false conditions, including short-circuits to ground or to supply potential at the terminals of the airbag squib arrangement itself. There is additionally provided a switching arrangement for implementing a predetermined priority of firing of a plurality of airbag squibs and reconfiguring electrically the plurality of airbag squibs.

11 Claims, 1 Drawing Sheet

SWITCHED CAPACITOR CIRCUIT FOR FIRING VEHICLE AIRBAG SQUIBS

BACKGROUND OF THE INVENTION

1. Field of the Invention

This invention relates generally to safety systems, such as supplemental restraint systems for vehicles, and more particularly, to a fault-tolerant circuit that will deliver at least a predetermined minimum triggering energy to the squib of a supplemental restraint system, or other safety device, notwithstanding the presence of plural faults, such as short-circuits.

2. Description of the Related Art

Supplemental restraint systems which typically are used in vehicles deploy an inflatable airbag that is coupled to a gas generating device. When a fault condition of the type requiring deployment of an inflatable airbag is present, an electronic control unit, in response to a fault condition signal, causes a predeterminable quantum of electrical energy to be delivered to an ignitable airbag squib. The squib, which is in communication with the gas generator, causes the generator to inflate the airbag by releasing rapidly an inert, non-toxic gas, such as nitrogen. The rate of release of the gas is sufficient to inflate the airbag generally within milliseconds of the onset of the fault condition.

Typically, a fault condition will result from a collision by the vehicle. A sensor, that may take the form of a normally-open switch, operates in response to an inertial mass to complete an electrical circuit that causes the electronic control unit to issue a relatively large current to the ignitable squib. Ultimately, this causes the gas generator to be activated, or ignited, resulting in the rapid release of the inert gas.

One disadvantage of the known inflatable airbag control arrangements is that a highly reliable, low resistivity, interconnection must be maintained between the electronic control unit and the ignitable squib. Such an interconnection cannot tolerate short-circuiting to ground or the application of battery potential on either cable that couples the control circuit to the airbag squib.

There is, therefore, the need for an arrangement that can withstand short-circuiting to ground, or to the vehicle's supply potential without unintentionally firing, or being precluded from firing in the event of an emergency condition. There is a need that such reliability be present even when one of the terminals of the airbag squib is itself short-circuited.

It is, therefore, an object of this invention to provide a system for firing a safety device wherein electrical components that are critical to the operation of the system can readily be tested for functionality.

It is another object of this invention to provide a system for firing a safety device wherein the number of electrical components required to achieve reliable system operation and testing is minimized.

It is also an object of this invention to provide a system for firing a safety device wherein the possibility of unintentionally firing the safety device is reduced, particularly including during testing of the system.

It is a further object of this invention to provide a system for firing an electrical safety device of the type fired by conduction of a current therethrough of at least predetermined magnitude, wherein the unintentional application of a supply potential directly to the safety device, such as would result from certain short-circuit fault conditions, will not result in the firing of the electrical safety device.

It is additionally an object of this invention to provide a system for firing selectable ones of a plurality of electrical safety devices wherein the number of possible fault conditions that might cause unintentional firing of the safety device is reduced.

It is yet a further object of this invention to provide a system for firing selectable ones of a plurality of electrical safety devices wherein individual ones of the electrical safety devices can be subjected to a diagnostic procedure.

It is also another object of this invention to provide a system for firing selectable ones of a plurality of electrical safety devices wherein a firing current is easily distributed and its magnitude controlled.

It is yet an additional object of this invention to provide a system for firing an electrical safety device wherein the number of possible fault conditions that might cause unintentional firing of the safety device is reduced.

It is still another object of this invention to provide a system for firing an electrical safety device wherein immunity to electromagnetic interference is increased.

It is a yet further object of this invention to provide a system for firing an electrical safety device wherein firing reliability is enhanced while simultaneously affording the ability to abort a firing process in the event it is determined, between the time subsequent to issuance of a firing command and prior to actual firing, that the firing command was issued in response to a fault condition.

It is also a further object of this invention to provide a system for firing selectable ones of a plurality of electrical safety devices which might be subject to plural simultaneous fault conditions, while retaining high system reliability, at reasonable cost.

SUMMARY OF THE INVENTION

The foregoing and other objects are achieved by this invention which provides in an apparatus aspect thereof, an arrangement for supplying a triggering current to a safety device of the type having first and second electrical terminals coupled thereto. The arrangement is of the type that employs a sensor for producing a predeterminable electrical characteristic in response to a selected emergency condition. In accordance with the invention, there is provided an energy storage element having first and second terminals for storing a quantum of electrical energy sufficient to trigger the safety device. A first switching element is coupled electrically to the first terminal of the energy storage device, and to the first terminal of the safety device. Similarly, a second switching device couples electrically the second terminal of the energy storage device with the second terminal of the safety device. Thus, switching is achieved at both terminals of the safety device.

In one embodiment of the invention, there is provided a third switching device for coupling electrically the first switching device to the terminal of the safety device, and a fourth switching device for coupling electrically the second switching device to the second terminal of the safety device. Thus, a second bank of switches is between the first and second switching devices and the safety device. There is additionally provided, in this embodiment, a first capacitor having a first terminal coupled to the third switching device, and a second terminal coupled to the fourth switching device. The first capacitor, therefore, is coupled across the switching devices and electrically between switches.

In a preferred embodiment of the invention, the energy storage device is a storage capacitor having sufficient capacity to store a quantum of energy sufficient to trigger the safety device. A safety device that could be used in the practice of the invention is an airbag safety squib of the type that causes an airbag supplemental restraint system of a vehicle to be deployed. In such an arrangement, a second capacitor is coupled across the safety device and serves, in part, to prevent transient wave forms from being applied to the safety device and to maintain current flow while the storage capacitor gets recharged.

In accordance with a system aspect of the invention, there is a provided a system for supply a triggering energy to an airbag squib of a vehicle's supplemental restraint system. The airbag squib has first and second terminals for receiving the triggering energy. In accordance with the invention, an energy storage capacitor is provided having first and second terminals. A first electronic switch having input, output, and control terminals is coupled at its input terminal to the first terminal of the energy storage capacitor. A second electronic switch, also having input, output, and control terminals, is coupled at its input terminal to the second terminal of the energy storage capacitor. A second capacitor having first and second terminals is provided, the first terminal thereof being coupled to the output terminal of the first electronic switch, and the second electronic switch being coupled at its output terminal to the second terminal of the second capacitor. There is additionally provided a third electronic switch having an input terminal coupled to the first terminal of the second capacitor, and an output terminal coupled to the first terminal of the airbag squib. Also, a fourth electronic switch having an input terminal coupled to the second terminal of the second capacitor is provided. The output terminal of the fourth electronic switch is coupled to the second terminal of the airbag squib.

In one embodiment of this further aspect of the invention, there is provided a third capacitor coupled electrically parallel with the airbag squib.

In one highly advantageous embodiment of the invention, there are provided an additional plurality of further airbag squibs, and a switching system for implementing a predetermined priority order of firing of the airbag squibs. The switching system is coupled to the output terminals of the third and fourth electronic switches.

In accordance with a further aspect of the invention, there is provided an arrangement for supplying a triggering current to a plurality of safety devices. The arrangement is of the type that employs a sensor for producing a predeterminable electrical characteristic in response to a selected emergency condition, the arrangement comprising. An energy storage element having first and second terminals stores a quantum of electrical energy sufficient to trigger the safety devices. A first switch is coupled electrically the first terminal of the energy storage element to the first terminal of the safety devices. A second switch couples electrically the second terminal of the energy storage element to the second terminal of the safety devices. Additionally, there is provided a configuration switching arrangement for reconfiguring electrically the plurality of safety devices.

In one embodiment of this further aspect of the invention, the configuration switching arrangement includes a controller for monitoring a predetermined electrical condition of the energy storage element, and a plurality of controllable switches, each having conductive and non-conductive states, the conductive and non-conductive states being selectable in response to the controller arrangement.

BRIEF DESCRIPTION OF THE DRAWINGS

Comprehension of the invention is facilitated by reading the following detailed description, in conjunction with the annexed drawing, in which.

DETAILED DESCRIPTION

Figure 1:
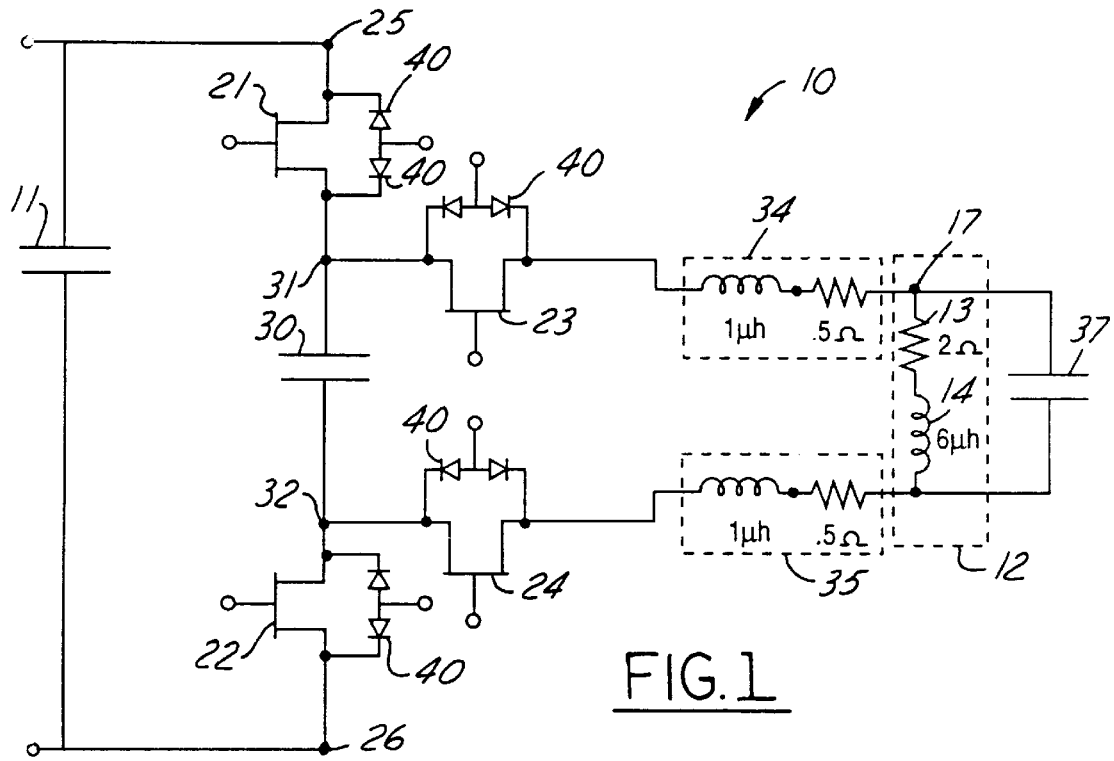
FIG. 1 is a simplified schematic representation of a circuit for delivering a triggering energy to a safety device, the circuit being arranged in accordance with the principles of the invention.

FIG. 1 is a simplified schematic representation of a circuit for delivering a triggering energy to a safety device such as an airbag squib for actuating an airbag supplemental restraint system for a vehicle. As shown, circuit 10 is provided with an energy storage means or capacitor 11 that, in this embodiment of the invention, has the capacity to store sufficient energy to trigger the squib 12 that is shown in schematic, equivalent circuit form by the circuitry in the region bounded by dashed line 12. In this embodiment, an equivalent resistor 13 is coupled in series with an inductance 14 and coupled across a pair of terminals 17 and 19 of circuit 10. Electrical energy for firing the squib 12 is derived from an electrical charge stored in the energy storage capacitor 11. As is readily understood, the supply voltage for the firing of the squib, which corresponds to the voltage across the energy storage capacitor 11, will decrease during squib firing as the capacitor is discharged. However, in situations where the vehicle battery (not shown) remains electrically coupled to the circuit 10 during the firing of the squib 12, the supply voltage across the energy storage capacitor 11 would remain constant.

The path of propagation of the energy from the energy storage capacitor 11 includes a first electronic switch means 21, a second electronic switch means 22, a third electronic switch 23 means, and a fourth electronic switch means 24. The first electronic switch 21 is coupled at an input thereof to a terminal 25 at which is connected to one side of the energy storage capacitor 11. Similarly, the second electronic switch 22 is coupled at an input thereof to a terminal 26 at which is also connected the other side of the energy storage capacitor 11. The outputs of the first and second electronic switches 21 and 22 are coupled across a second capacitor 30. In the present specific illustrative embodiment of the invention, the current path includes the four electronic switches (21–24). The use of the four electronic switch means results in a slight increase in energy loss. However, this disadvantage is outweighed by the ability of the present arrangement to effect the firing of the squib with a short-circuit condition. As will described below, the present invention provides the additional advantage of permitting improved utilization of the available charge by permitting reconfiguration of plural squibs into predeterminable series and parallel connections. This improved charge utilization characteristic overcomes the disadvantage of energy loss resulting from use of the additional electronic switch means. In addition, the energy loss characteristic of the present invention becomes less significant as the industry continues the current trend to convert from present "basting cap" style squibs to silicon squibs which require about an order of magnitude less energy to fire. In an application-specific integrated circuit (ASIC) implementation of the invention (not shown), the present invention will require no additional silicon area, and therefore the ASIC's cost will not be significantly higher than known arrangements.

The third electronic switch 23 is coupled at an input thereof to the output of the first electronic switch 21, and to one side of a second capacitor 30, specifically at a terminal 31. Similarly, the fourth electronic switch 24 is coupled at an input thereof to the output of the second electronic switch 22, and to the other side of the second capacitor 30, specifically at a terminal 32. The outputs of the third and fourth electronic switches 23 and 24 are connected to respectively associated transmission lines 34 and 35 that are shown in this specific illustrative embodiment of the invention in equivalent form. Each transmission line, therefore is shown to have an associated respective equivalent resistance of 0.5 ohms and a series inductance of 1 $\mu$h. The transmission lines 34 and 35 are terminated at respective terminals 17 and 19 across which is coupled the squib 12 and, in this embodiment, a third capacitor 37. The third capacitor 37 is an optional capacitor that increases immunity to electromagnetic interference (EMI); maintains current flow through the squib 12 when the transfer capacitor 30 is being recharged; and optimizes the energy transfer between the transfer capacitor and the squib.

The second capacitor 30 is a transfer capacitor, the value of which can be determined by persons of skill in the art in response to the switching duty cycle of the system. Generally, the value of the capacity of the second capacitor 30 should be smaller than that of the energy storage capacitor 11, which is 470 $\mu$f in a practical embodiment of the invention, and larger than the size of the third capacitor 37. The energy storage capacitor 11 must be large enough to supply the energy and current needed to fire all of the squibs and under worst case conditions. In this specific illustrative embodiment of the invention, the energy storage capacitor 11 is charged to about 30 volts by a conventional switching voltage converter (not shown).

In a test arrangement, voltage potentials were applied such that the electronic switches would be fully conductive (i.e. hard on). In this fully conductive, saturated state, each of the electronic switches represented a resistance of approximately 1.6 ohms. Various short-circuit fault modes were introduced into circuit 10, such as short-circuiting the terminal 19 to the vehicle supply voltage, and at other times, short-circuiting the terminal 17 to ground. Although the current flowing through the squib 12 was reduced by approximately 20%, in these two shorted cases, sufficient energy was deliverable to effect triggering of a standard airbag squib. In a practical embodiment of the invention, the bias voltages for the electronic switches 22 and 24 must be at least −8 volts in order to prevent the junction from forward biasing, as would be the case in a short circuit of the terminal 17 to ground. During a successful test of this system, −15 volts was applied as the bias voltage, and resulted in successful transmission of energy to the squib 12 in a quantity sufficient to cause triggering. In the simulated situation described herein, the bias voltage applied to the first and third electronic switches 21 and 23 was 0 volts. Also, a 40 volt gate voltage was used in the system simulation just described to ensure that the transistors that form the electronic switches are fully on.

The gate signals to the electronic switches are obtained from the microcontroller (not shown in this figure), which in the ASIC embodiment of the invention, are amplified. Also in such an embodiment, the diodes 40 are part of the ASIC. The ASIC further contains current regulation circuitry that regulates the current to within specifications established by squib manufacturers.

Figure 2:
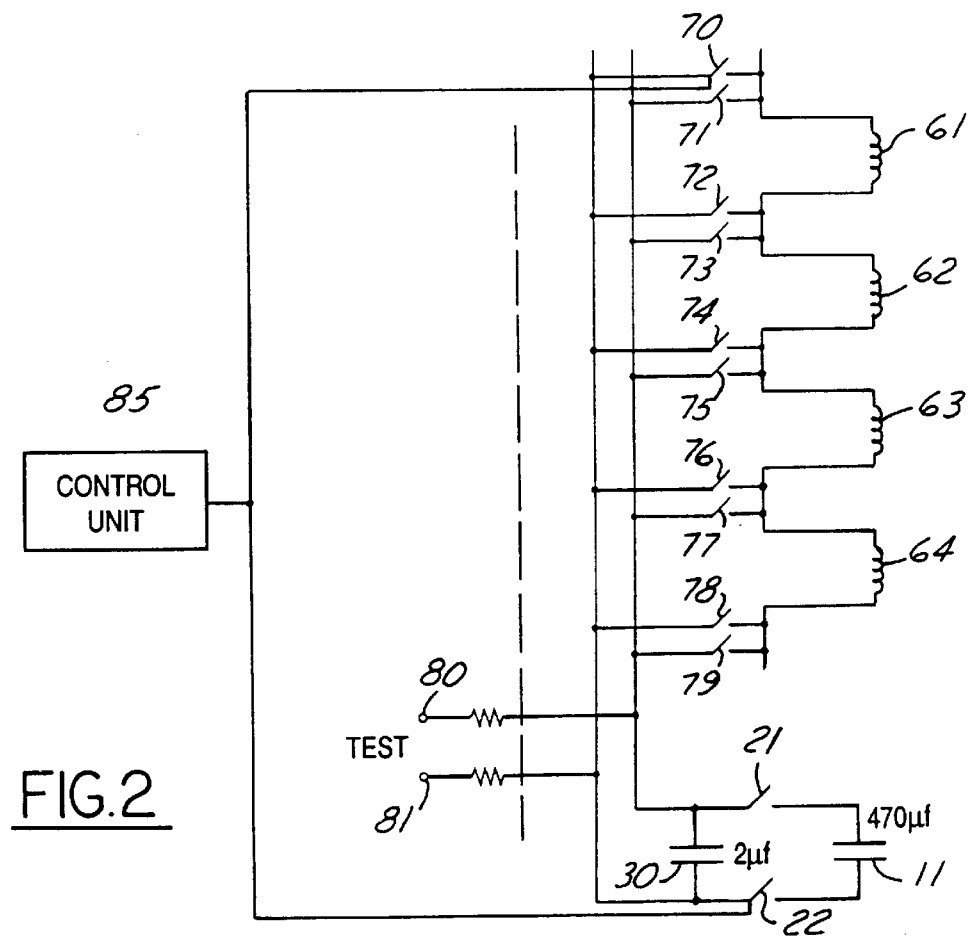
FIG. 2 is a is a simplified schematic representation of a switching arrangement for delivering a triggering energy to a plurality of safety devices in accordance with a predetermined firing priority, the switching arrangement being configured in accordance with the principles of the invention.

FIG. 2 is a simplified schematic representation of a switching arrangement for delivering a triggering energy, such as from the circuit of FIG. 1 to a plurality of safety devices. As shown, a plurality of airbag squibs 61, 62, 63 and 64, are arranged substantially in serial interconnection with switching devices 70–79, coupled thereto. The switching devices serve to connect squibs 61–64, in accordance with a predetermined priority, to the energy storage capacitors 11 and the second or transfer capacitor 30. As such, the electronic switches 70–79 function in a manner similar to that of the third and fourth electronic switches 23 and 24, described hereinabove with respect to FIG. 1. In a testing environment of the circuit of FIG. 2, system efficiency and capacitor energy usage can be determined by monitoring voltages at the test terminals 80 and 81. In a multi-squib embodiment, such as that shown in FIG. 2, a higher operating voltage for the energy storage capacitor 11 would be required to ensure that sufficient energy is available to fire all of the squibs.

The electronic switches 21, 22, and 70–79, in this specific illustrative embodiment of the invention, are controllable switches under the control of a control unit 85. The control unit 85 contains a microcomputer that functions to monitor a variety of system parameters, including certain electrical conditions of the energy storage capacitor 11, such as its actual charge and its charge or discharge rates. The microcomputer monitors continuously the voltages and other data, and records the status of the system. Predetermined system firing priorities can then be effected based upon the updated information. Thus, for example, when the capacitor voltage is high, the squibs will be organized electrically in series, and when the capacitor voltage is lower, a parallel arrangement would be effected.

In certain embodiments of the invention, the switching of the capacitors can facilitate voltage doubling to effect greater energy storage. It is a further advantage of the present invention that the risk of inadvertent firing of the squibs is reduced over known arrangements. Additionally, the present invention achieves this without requiring a tuned circuit to effect maximum energy transfer to the squib.

As shown, the arrangement of FIG. 2 facilitates electrical access to airbag squibs 61, 62, 63 and 64 from the test terminals 80 and 81 using DC, AC, or pulses. Testing can be performed in any of several selectable modes, including electrically serial, electrically parallel, or any combination thereof. In a practicable embodiment of the invention, the testing system is controlled by the control unit 85, which controls the conduction states of the electronic switch means, as previously described.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for supplying a triggering current to a safety device for actuating an airbag supplemental restraint system for a vehicle, the safety device having first and second electrical terminals coupled thereto, the arrangement employing a sensor for producing a predeterminable electrical characteristic in response to an emergency condition, the arrangement comprising:

an energy storage element having first and second terminals for storing a quantum of electrical energy sufficient to trigger the safety device;

a first switch for forming a first electrical path between the first terminal of said energy storage element to the first terminal of the safety device;

a second switch for forming a first electrical path between the second terminal of said energy storage element to the second terminal of the safety devices;

a third switch for forming a second electrical path between said first switch and the first terminal of the safety device; and a fourth switch for forming a second electrical path between said second switch and the second terminal of the safety device.

2. The arrangement of claim 1, wherein said energy storage element comprises a first capacitor.

3. The arrangement of claim 2, wherein there is further provided a second capacitor having a first terminal coupled to said third switch and a second terminal coupled to said fourth switch.

4. The arrangement of claim 2, wherein there is further provided a third capacitor coupled across the safety device for increasing immunity to electromagnetic interference.

5. A system for supplying a triggering energy to an airbag squib of a vehicle supplemental restraint system, the airbag squib having first and second terminals for receiving the triggering energy, the system comprising:

an energy storage capacitor having first and second terminals;

a first electronic switch having input, output, and control terminals, said first electronic switch being coupled at its input terminal to said first terminal of said energy storage capacitor;

a second electronic switch having input, output, and control terminals, said second electronic switch being coupled at its input terminal to said second terminal of said energy storage capacitor;

a second capacitor having first and second terminals, said first terminal being coupled to said output terminal of said first electronic switch and said second electronic switch being coupled at its output terminal to said second terminal of said second capacitor;

a third electronic switch having an input terminal coupled to said first terminal of said second capacitor, and an output terminal coupled to the first terminal of the airbag squib; and a fourth electronic switch having an input terminal coupled to said second terminal of said second capacitor, and an output terminal coupled to the second terminal of the airbag squib.

6. The system of claim 5, wherein there is further provided a third capacitor coupled electrically parallel with the airbag squib.

7. The system of claim 5, wherein there is provided a plurality of further airbag squibs, and there is further provided an airbag squib switching system for implementing a predetermined priority order of firing of said airbag squibs.

8. The system of claim 7, wherein there is further provided coupling means for coupling said airbag squib switching system to said output terminals of said third and fourth electronic switches.

9. An arrangement for supplying a triggering current to a plurality of safety devices, each having respectively associated first and second terminals, the arrangement being of the type that employs a sensor for producing a predeterminable electrical characteristic in response to a selected emergency condition, the arrangement comprising:

energy storage means having first and second terminals for storing a quantum of electrical energy sufficient to trigger the safety devices;

first switching means for forming a controllable electrical path for the triggering current between the first terminal of said energy storage means and the first terminals of the safety devices;

second switching means for forming a controllable electrical path for the triggering current between the second terminal of said energy storage means to the second terminals of the safety devices;

third switching means for coupling electrically said first switching means to the first terminal of the safety device;

fourth switching means for coupling electrically said second switching means to the second terminal of the safety device; and a configuration switching arrangement for reconfiguring electrically the plurality of safety devices.

10. The arrangement of claim 9, wherein said configuration switching means comprises:

a controller for monitoring a predetermined electrical condition of said energy storage means; and a plurality of controllable switches, each having conductive and non-conductive states, the conductive and non-conductive states being selectable in response to said controller.

11. An arrangement for supplying a triggering current to a safety device such as an airbag squib for actuating an airbag supplemental restraint system for a vehicle having first and second electrical terminals coupled thereto, the arrangement employing a sensor for producing a predeterminable electrical characteristic in response to a selected emergency condition, the arrangement comprising:

an energy storage device having first and second terminals for storing a quantum of electrical energy sufficient to trigger the safety device;

a first switch for coupling electrically the first terminal of said energy storage device to the first terminal of the safety device;

a second switch for coupling electrically the second terminal of said energy storage device to the second terminal of the safety device; and a capacitor coupled across the safety device for increasing immunity to electromagnetic interference.

* * * * *